(12) United States Patent
Ishii et al.

(10) Patent No.: US 12,249,110 B2
(45) Date of Patent: Mar. 11, 2025

(54) CONTROL SYSTEM AND CONTROL METHOD

(71) Applicant: Panasonic Intellectual Property Corporation of America, Torrance, CA (US)

(72) Inventors: Yasunori Ishii, Osaka (JP); Satoshi Sato, Kyoto (JP); Kunio Nobori, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 547 days.

(21) Appl. No.: 17/553,137

(22) Filed: Dec. 16, 2021

(65) Prior Publication Data

US 2022/0207857 A1 Jun. 30, 2022

(30) Foreign Application Priority Data

Dec. 24, 2020 (JP) .................................. 2020-215791

(51) Int. Cl.
| | |
|---|---|
| G06K 9/00 | (2022.01) |
| G06N 20/00 | (2019.01) |
| G06V 10/14 | (2022.01) |
| G06V 10/60 | (2022.01) |

(52) U.S. Cl.
CPC ............. *G06V 10/60* (2022.01); *G06N 20/00* (2019.01); *G06V 10/14* (2022.01)

(58) Field of Classification Search
CPC ......... G06V 10/60; G06V 10/14; G06N 20/00
See application file for complete search history.

(56) References Cited

U.S. PATENT DOCUMENTS

| | | | |
|---|---|---|---|
| 11,978,181 B1* | 5/2024 | Pieper | G06T 11/001 |
| 2018/0268255 A1* | 9/2018 | Surazhsky | G06N 3/045 |
| 2019/0294923 A1* | 9/2019 | Riley | G06F 18/24 |
| 2020/0051260 A1* | 2/2020 | Shen | G06N 3/045 |
| 2020/0065625 A1* | 2/2020 | Kaufhold | G06N 3/048 |
| 2020/0342652 A1* | 10/2020 | Rowell | G06V 10/82 |
| 2022/0351498 A1* | 11/2022 | Hutter | G06V 10/764 |

OTHER PUBLICATIONS

Kashiwagi, Masako, et al. "Deep depth from aberration map." Proceedings of the IEEE/CVF International Conference on Computer Vision. 2019. (Year: 2019).*

Kashiwagi et al., "Deep Depth from Aberration Map", International Conference on Computer Vision Foundation 2019, IEEE, Oct. 2019, pp. 4070-4079.

Sato et al., "Cognitive Sensing: Depth Estimation with Multi-Pinhole Camera using Deep Learning", Panasonic Technical Journal, vol. 64, No. 1, May 15, 2018, pp. 33-38 (partial translation).

* cited by examiner

*Primary Examiner* — Avinash Yentrapati
(74) *Attorney, Agent, or Firm* — Greenblum & Bernstein, P.L.C.

(57) ABSTRACT

A control device includes a parameter acquisition unit that acquires an augmentation parameter regarding geometric augmentation or optical augmentation of training data to be used for training a machine learning model, a display controller that causes a display device to display an image based on the augmentation parameter, an imaging controller that causes an imaging device to capture the displayed image, and an output unit that outputs the captured image obtained by the imaging device as the training data.

6 Claims, 14 Drawing Sheets

CAPTURED IMAGE

PROCESSING

PROCESSED IMAGE

ORIGINAL IMAGE

⬇ PROCESSING

DISPLAYED IMAGE

⬇ CAPTURE

CAPTURED IMAGE

LUMINANCE CHARACTERISTIC
INFORMATION

ORIGINAL IMAGE

⬇ PROCESSING

DISPLAYED IMAGE

⬇ CAPTURE

CAPTURED IMAGE

CONTROL SYSTEM AND CONTROL METHOD

FIELD OF THE INVENTION

The present disclosure relates to a technique for generating training data to be used for training of machine learning model.

BACKGROUND ART

Machine learning of a neural network for performing image recognition requires a large number of images with correct answer label.

For example, Masako Kashiwagi, Nao Mishima, Tatsuo Kozakaya, Shinsaku Hiura, "Deep Depth from Aberration Map", International Conference on Computer Vision Foundation 2019, IEEE, October 2019, pp. 4070-4079 (hereinafter, referred to as Non-Patent Literature 1) discloses a distance measuring method for measuring a distance of a subject using a deep neural network that analyzes, based on one captured image, an association relationship between the distance and position of the subject on an image and a characteristic of blurring of the image due to lens aberration. The experimental system described in Non-Patent Literature 1 includes a monitor that randomly displays a natural image, a slide stage that moves a monocular camera, a monocular camera that images a screen of the monitor that has displayed the natural image, and an aberration map analysis network (AMA-Net) that stores a distance between the monitor and the monocular camera in association with the captured image. As a result, the experimental system fully automatically collects training data to be used for pre-training of the deep neural network.

However, with the above-described conventional technique, image variations that have come under the same influence of an optical system of an imaging device are not increased. Thus, further improvement is required.

SUMMARY OF THE INVENTION

The present disclosure has been made to solve the above problem, and an object of the present disclosure is to provide a technique capable of increasing image variations that have come under the same influence of an optical system of an imaging device as training data.

A control system from an aspect of the present disclosure includes an acquisition unit that acquires a parameter regarding geometric augmentation or optical augmentation of training data used for training a machine learning model, a display controller that causes a display device to display an image based on the parameter, an imaging controller that causes an imaging device to capture the displayed image, and an output unit that outputs the captured image obtained by the imaging device as the training data.

Figure 1:
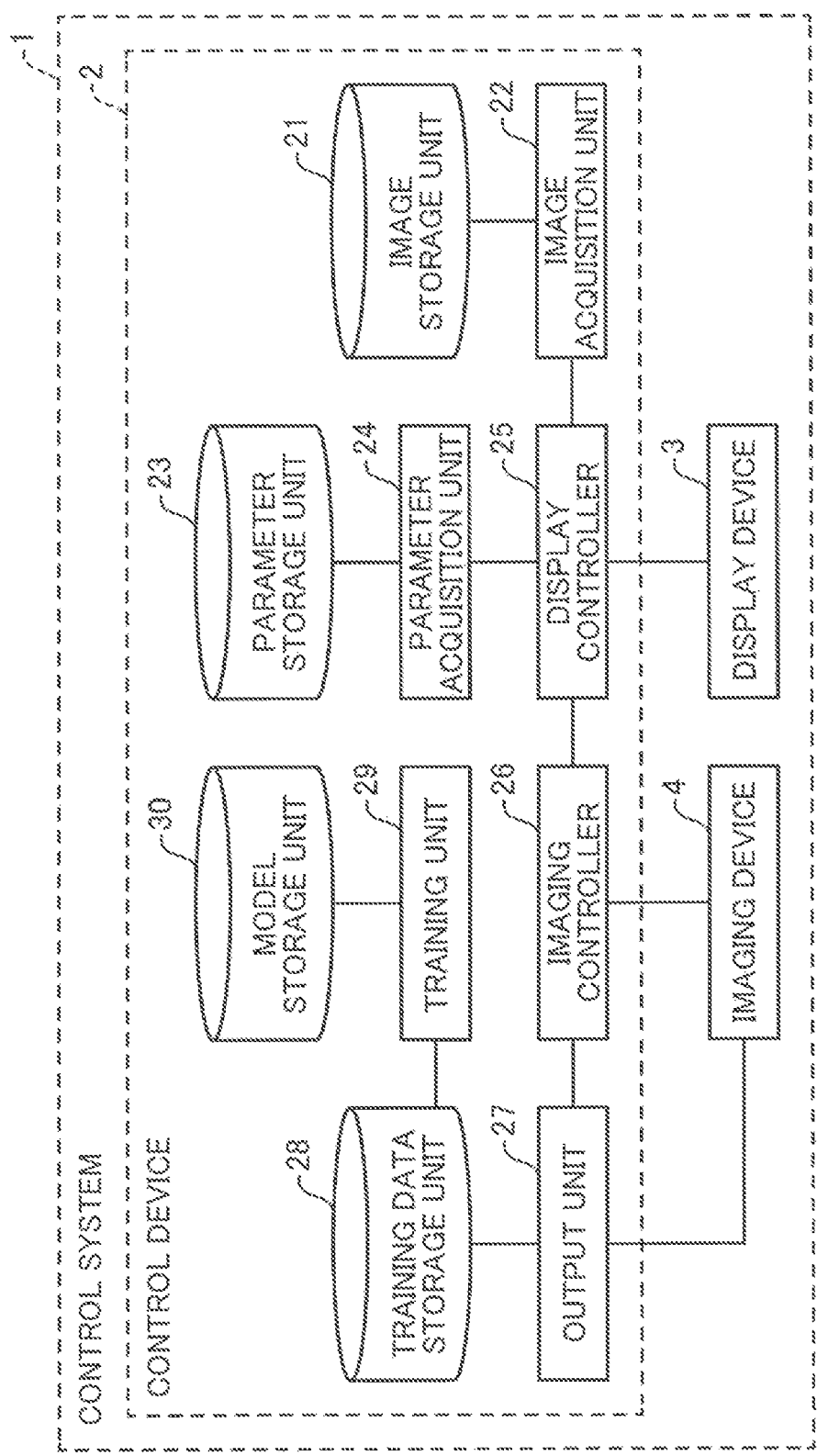
FIG. 1 is a block diagram illustrating an example of an overall configuration of a control system according to a first embodiment of the present disclosure.

DESCRIPTION OF EMBODIMENTS (Findings to be Basis of the Present Disclosure)

At home or in indoors, various recognition technologies am important, and such technologies include recognition of a behavior of a person in an environment or recognition of a person as a device operator. In recent years, a technology called deep learning has attracted attention for object recognition. The deep learning is machine learning using a neural network having a multilayer structure. Use of a large amount of training data in the deep learning can achieve higher precision recognition performance as compared with the conventional method. In such object recognition, image information is particularly effective. Various methods have been proposed in order to greatly improve conventional object recognition capability by using a camera as an input device and performing deep learning using image information as an input.

However, disposing a camera at home or the like has a problem that privacy is violated in a case where a captured image leaks to the outside due to hacking or the like. Therefore, it is necessary to take a measure to protect the privacy of the subject even if the captured image leaks to the outside.

For example, a multi-pinhole camera can be used as a camera for obtaining a blurred image that is difficult to be visually recognize by a human. An image captured by the multi-pinhole camera or the like is difficult for a human to visually recognize due to intentionally created blurring. This is because on this image, a subject image is hardly focused due to superimposing of a plurality of images having different viewpoints or non-use of a lens. Therefore, the image captured by the multi-pinhole camera or the like is preferably used to construct an image recognition system in an environment requiring privacy protection, such as home or indoors. Note that the multi-pinhole camera is disclosed in Document "Cognitive Sensing: Depth Estimation with Multi-Pinhole Camera using Deep Learning" (Satoshi Sato et al., Panasonic Technical Journal, Vol. 64, No. 1, pp. 33-38, issued on May 15, 2018).

However, the machine learning in an image recognition system requires the large amount of the training data with correct answer labels. Data augmentation is one technique to increase variations of the training data. In the data augmentation, a plurality of pieces of the training data is generated from one captured image by performing linear transformation, translation, and the like on the captured image.

An image captured by the multi-pinhole camera is affected by an optical system such as limb darkening. Therefore, when data augmentation is performed on the image captured by the multi-pinhole camera, training data of the limb darkening pattern that cannot occur in the imaging device used for image recognition is generated. For example, translation of the image causes the influence of limb darkening on the center of the image. Such training data does not contribute to improvement in image recognition performance of a machine learning model, and may cause erroneous recognition.

In Non-Patent Literature 1 described above, an image captured by a monocular camera is collected as the training data. However, Non-Patent Literature 1 does not refer to data augmentation for a captured image affected by an optical system of an imaging device.

In order to solve the above problem, a control system from an aspect of the present disclosure includes an acquisition unit that acquires a parameter regarding geometric augmentation or optical augmentation of training data used for training a machine learning model, a display controller that causes a display device to display an image based on the parameter, an imaging controller that causes an imaging device to capture the displayed image, and an output unit that outputs the captured image obtained by the imaging device as the training data.

According to this configuration, the image is displayed on the display device based on the parameter regarding the geometric augmentation or the optical augmentation of the training data, the displayed image is captured by the imaging device, and the captured image obtained by the imaging device is output as the training data. This makes it possible to increase image variations that have come under the same influence of the optical system of the imaging device as the training data. In addition, it is possible to generate training data matching the characteristic of the optical system of the imaging device at the time of image recognition without using, for training, the captured image that does not reflect the characteristic of the optical system of the imaging device. In addition, since the same characteristic of the optical system of the imaging device are reflected in an image to be used for training and an image to be used for recognition, erroneous recognition can be reduced. Further, since a training data set suitable for image recognition is structured, the amount of training data can be decreased, and a training time can be shortened.

In the above control system, the display controller may process the image in accordance with the parameter, and cause the display device to display the processed image.

According to this configuration, one image is processed so that another image different from the one image is generated. The generated another image is displayed on the display device, and the displayed another image is captured by the imaging device. Therefore, the captured image of the another image can be generated as training data, and thus the training data that takes into consideration the influence of the optical system of the imaging device can be easily increased.

Further, in the control system, the image processing may include at least one of linear transformation, translation, color conversion, and luminance conversion.

According to this configuration, when at least one of the linear transformation, the translation, the color conversion, and the luminance conversion is performed on the image, the types of images to be displayed on the display device can be increased. This makes it possible to increase the training data that takes into consideration the influence of the optical system of the imaging device.

Further, in the control system, the acquisition unit may further acquire luminance characteristic information indicating a luminance characteristic produced by the optical system of the imaging device, and the display controller may cause the display device to display the image based on the parameter and the luminance characteristic information.

According to this configuration, the image generated by using the parameter and the luminance characteristic obtained by the optical system of the imaging device is displayed. Therefore, a display object on the image can be displayed on a position having the desired luminance characteristic, and the training data reflecting the luminance characteristic produced by the optical system of the imaging device can be generated.

Further, in the above control system, the display controller may execute the image processing on a region on the image, the region having the luminance characteristic indicated by the luminance characteristic information, in accordance with the parameter, and cause the display device to display the processed image.

According to this configuration, the image processing is executed on the region of the image, the region having the specific luminance characteristic, in accordance with the parameter, and the processed image is displayed on the display device.

Therefore, the display object on the image can be displayed in the region of the image, the region having the specific luminance characteristic, and the training data reflecting the luminance characteristic produced by the optical system of the imaging device can be generated.

Further, in the above control system, the imaging device may include a multi-pinhole camera in which a mask having a mask pattern with a plurality of pinholes is disposed so as to cover a light receiving surface of an imaging element.

This configuration makes it possible to generate the training data reflecting an optical characteristic according to the number, position, shape, size, and thickness of the plurality of pinholes of the multi-pinhole camera.

The control system may further include a training unit that trains the machine learning model using the training data.

According to this configuration, since the machine learning model is trained by using the training data, the same characteristic of the optical system of the imaging device is reflected in the image to be used for training and the image to be used for recognition. This can reduce erroneous recognition in image recognition using the machine learning model.

Further, in the control system, a correct answer label to be used for training may be assigned in advance to the image to be displayed on the display device. The output unit may assign the correct answer label assigned in advance to the image to the captured image, and output the captured image with the correct answer label as the training data.

According to this configuration, since the correct answer label is automatically assigned to the captured image, an annotation work becomes easy.

In addition, the present disclosure can be achieved not only as the control system having the characteristic configuration as described above but also as a control method for executing characteristic processing corresponding to the characteristic configuration of the control system. Further, the present disclosure can also be implemented as a computer program that causes a computer to execute the characteristic processing included in such a control method. Therefore, the same effects as those of the above-described control system can be produced by the following other aspects.

In a control method from another aspect of the present disclosure, a computer acquires a parameter regarding geometric augmentation or optical augmentation of training data used for training a machine learning model, causes a display device to display an image based on the parameter, causes an imaging device to capture the displayed image, and outputs the captured image obtained by the imaging device as the training data.

Note that embodiments described below illustrate specific examples of the present disclosure. Numerical values, shapes, components, steps, and an order of the steps described in the following embodiments are examples, and thus do not limit the present disclosure. In the components in the following embodiments, components which are not described in independent claims representing highest-order concepts will be described as any components. In all the embodiments, their contents can be combined.

First Embodiment

FIG. 1 is a block diagram illustrating an example of an overall configuration of a control system 1 according to a first embodiment of the present disclosure. The control system 1 includes a control device 2, a display device 3, and an imaging device 4.

The display device 3 is, for example, a liquid crystal display device or an organic electro luminescence (EL) display device. The display device 3 is controlled by the control device 2 and displays an image output from the control device 2. Note that the display device 3 may be a projector that projects an image onto a screen.

Unlike a normal camera that captures a normal image without blurring, the imaging device 4 captures an image with blurring. The image obtained by the imaging device 4 is an image in which a human cannot recognize a subject due to intentionally created blurring even if the human sees the image.

The imaging device 4 is disposed in a position where the entire display screen of the display device 3 can be imaged. The imaging device 4 is, for example, a multi-pinhole camera in which a mask having a mask pattern with a plurality of pinholes is disposed to cover a light receiving surface of an imaging element. In other words, the mask pattern is provided between the subject and the light receiving surface.

Figure 2:
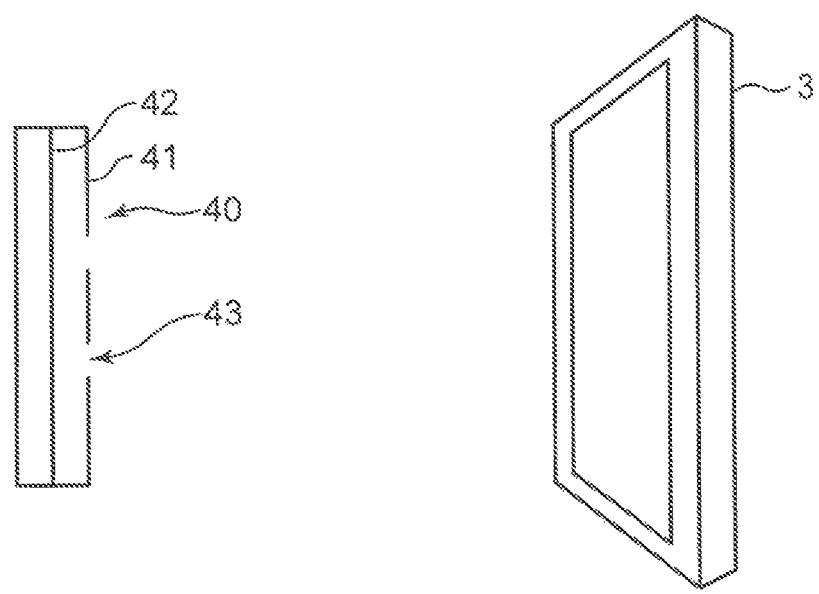
FIG. 2 is a diagram schematically illustrating a structure of a multi-pinhole camera as an example of an imaging device.

FIG. 2 is a diagram schematically illustrating a structure of a multi-pinhole camera 40 that is an example of the imaging device 4. FIG. 2 is a view of the multi-pinhole camera 40 and the display device 3 as viewed from above.

The multi-pinhole camera 40 illustrated in FIG. 2 includes a multi-pinhole mask 41 and an imaging element 42 such as a complementary metal oxide semiconductor (CMOS). The multi-pinhole mask 41 is disposed away from the light receiving surface of the imaging element 42 by a certain distance. The multi-pinhole mask 41 has a plurality of pinholes 43 arranged at random or at equal intervals. The imaging element 42 acquires a captured image obtained by capturing an image displayed on the display device 3 through each pinhole 43. An image acquired through each pinholes is referred to as a pinhole image.

Since the pinhole image differs depending on the position and size of each pinhole 43, the imaging element 42 acquires a superimposed image in a state (multiple image) in which a plurality of pinhole images is slightly shifted and superimposed. The positional relationship of the plurality of pinholes 43 affects a positional relationship of the plurality of pinhole images projected onto the imaging element 42 (that is, the degree of superimposition of the multiple image). The size of each pinhole 43 affects the degree of blurring of the pinhole image.

The use of the multi-pinhole mask 41 makes it possible to superimpose and acquire the plurality of pinhole images that is obtained from different positions and has different degrees of blurring. That is, it is possible to acquire a computational image in which the multiple image and blurring are intentionally created. Therefore, the captured image becomes a multiple and blurred image, and this makes it possible to acquire an image in which privacy of the subject is protected by the blurring.

In addition, the multi-pinhole camera 40 has no lens. Therefore, limb darkening and vignetting occur depending on the number, size, position, and thickness of the pinholes 43. The limb darkening is a phenomenon such that light intensity is attenuated from the vicinity of the center of the imaging element 42 toward the outer edge portion. The vignetting is a phenomenon such that the light intensity of the outer edge portion is attenuated due to the influence of a shielding object. The multi-pinhole mask 41 can be a shield. The limb darkening and vignetting are phenomena that occur due to the characteristic of the optical system of the multi-pinhole camera 40.

The multi-pinhole camera 40 is also used for image recognition using a trained machine learning model. In order to improve the image recognition performance of the machine learning model, the control device 2 according to the present embodiment collects images captured by the multi-pinhole camera 40 as training data, and uses the collected training data for training the machine learning model.

In FIG. 2, two pinholes 43 are arranged side by side in a horizontal direction, but the present disclosure is not particularly limited thereto. The multi-pinhole camera 40 may include three or more pinholes 43.

In addition, the imaging device 4 according to the first embodiment is not limited to the multi-pinhole camera. The imaging device 4 may be a camera equipped with a fisheye lens or a light field camera.

Figure 3:
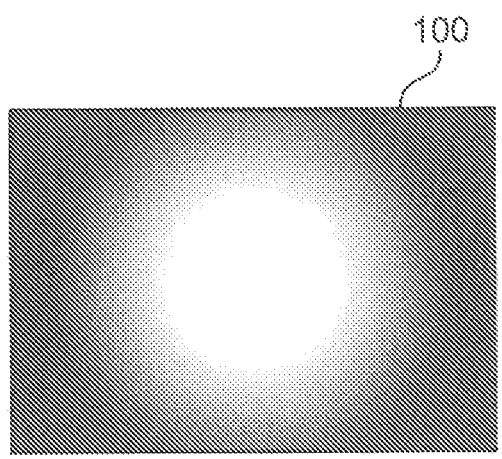
FIG. 3 is a view illustrating an example of a captured image obtained by the imaging device.

FIG. 3 is a diagram illustrating an example of a pattern of limb darkening appearing on a captured image obtained by the imaging device 4.

As described above, the imaging device 4 is the lensless multi-pinhole camera 40. Therefore, limb darkening occurs in the imaging element 42, and the light intensity is gradually attenuated from the center of the imaging element 42 toward the image end. Due to the limb darkening, the luminance of the captured image 100 gradually decreases from the center toward the image end, and is close to 0 in the vicinity of upper, lower, left, and right ends. Note that the pattern of the limb darkening illustrated in FIG. 3 is an example. The pattern of the limb darkening varies depending on the number, size, position, and thickness of the pinholes 43 of the multi-pinhole camera 40.

Figure 4:
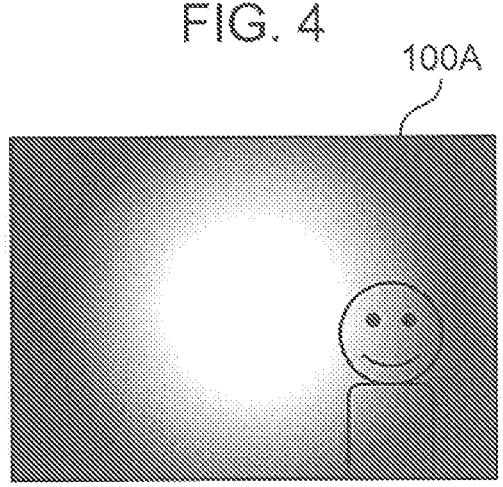
FIG. 4 is a schematic diagram for explaining conventional image processing executed on the captured image.
Figure 4:
Figure 4:
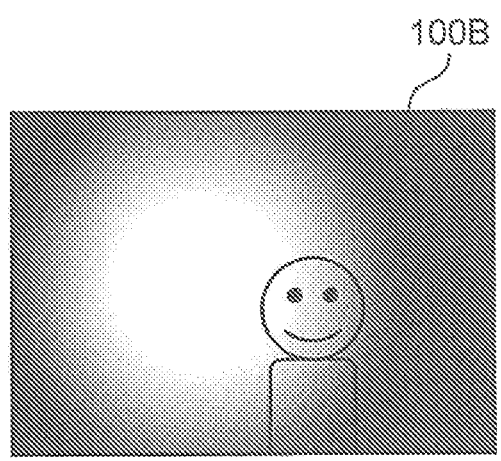

FIG. 4 is a schematic diagram for explaining conventional image processing executed on a captured image.

A large number of images with correct answer label are required for training and evaluation of the machine learning model, and data augmentation processing is essential. The data augmentation processing is processing for processing one image to generate another image from the one image. Further, as the training image, an image obtained by actually imaging a subject is more preferable than an image created by computer graphics. Conventionally, a captured image is subject to the image processing (data augmentation processing).

As illustrated in FIG. 4, after the processing for translating the captured image 100A leftward is executed, a black image is added to the right portion of a processed image 1003 that has been subject to the processing. As a result, luminance distribution (the pattern of limb darkening) of the processed image 100B is different from luminance distribution of the captured image 100A. Therefore, even if the machine learning model is trained by using the processed image 100B as the training data, the machine learning model is trained under the influence of the pattern of limb darkening that cannot be originally obtained by the imaging device 4. Thus, image recognition with high accuracy becomes difficult. Therefore, the control device 2 according to the first embodiment executes the image processing on an original image, causes the display device 3 to display the processed image, and causes the imaging device 4 to capture the displayed image. This makes it possible to increase image variations that have come under the same influence of the optical system of the imaging device 4 as the training data.

Specifically, the control device 2 includes a microprocessor, a random access memory (RAM), a read only memory (ROM), and a hard disk, not illustrated. The RAM, the ROM, or the hard disk stores a computer program, and the microprocessor operates in accordance with the computer program to realize the function of the control device 2.

The control device 2 includes an image storage unit 21, an image acquisition unit 22, a parameter storage unit 23, a parameter acquisition unit 24, a display controller 25, an imaging controller 26, an output unit 27, a training data storage unit 28, a training unit 29, and a model storage unit 30.

The image storage unit 21 stores in advance an image captured by a normal camera that captures an image in which a subject as a recognition target of the machine learning model is imaged and no limb darkening or less limb darkening occurs. Note that a correct answer label (annotation information) to be used for training is assigned to the image in advance. That is, the image storage unit 21 stores the image in association with the correct answer label.

The image acquisition unit 22 acquires the image from the image storage unit 21. The image acquisition unit 22 outputs the image acquired from the image storage unit 21 to the display controller 25. In the first embodiment, the control device 2 includes the image storage unit 21, but the present disclosure is not particularly limited thereto. An external computer connected to the control device 2 via a network may include the image storage unit 21. In this case, the image acquisition unit 22 may receive an image transmitted by the external computer.

The parameter storage unit 23 stores in advance an augmentation parameter regarding geometric augmentation or optical augmentation of the training data to be used for training the machine learning model. The augmentation parameter includes information for specifying the content of the processing for processing an image and a parameter value to be used in the processing. Note that the image processing is also referred to as data augmentation processing. The image processing includes at least one of linear transformation processing, translation processing, color conversion processing, and luminance conversion processing. The linear transformation processing and the translation processing are examples of the geometric augmentation. The color conversion processing and the luminance conversion processing are examples of the optical augmentation.

The linear transformation processing includes at least one of rotation processing for rotating an image, enlargement processing for enlarging an image, reduction processing for reducing an image, and shear processing for shearing an image. The augmentation parameter of the rotation processing represents a rotation angle. The augmentation parameter of the enlargement processing represents the scale of enlargement. The augmentation parameter of the reduction processing represents the scale of reduction. The shear processing is processing for deforming an image into a parallelogram. The augmentation parameter of the shear processing represents an inclination angle with respect to a horizontal axis (X axis) or an inclination angle with respect to a vertical axis (Y axis).

The translation processing includes at least one of horizontal translation processing for translating an image horizontally and vertical translation processing for translating an image vertically. The augmentation parameter of the horizontal translation processing represents a horizontal translation amount. The augmentation parameter of the vertical translation processing represents a vertical translation amount. Note that the translation amount is represented by, for example, the number of pixels.

Note that the linear transformation processing and the translation processing can be executed by affine transformation. Therefore, the augmentation parameters of the linear transformation processing and the translation processing may be values of a transformation matrix to be used for affine transformation.

The color conversion processing is processing for converting a color of an image. The augmentation parameter of the color conversion processing represents a red-green-blue (RGB) value of each pixel of an image. The luminance conversion processing is processing for converting the luminance of an image. The augmentation parameter of the luminance conversion processing represents a luminance value of each pixel of an image.

Note that the processing may further include processing for adding a noise to an image or processing for masking a part of an image.

The parameter acquisition unit 24 acquires an augmentation parameter regarding geometric augmentation or optical augmentation of the training data to be used for training a machine learning model. The parameter acquisition unit 24 reads the augmentation parameter from the parameter storage unit 23. The parameter acquisition unit 24 outputs the augmentation parameter acquired from the parameter storage unit 23 to the display controller 25.

Although the control device 2 includes the parameter storage unit 23 in the first embodiment, the present disclosure is not particularly limited thereto. An external computer connected to the control device 2 via a network may include the parameter storage unit 23. In this case, the parameter acquisition unit 24 may receive the augmentation parameter transmitted by the external computer.

The display controller 25 causes the display device 3 to display an image based on the augmentation parameter. The display controller 25 processes the image in accordance with the augmentation parameter, and causes the display device 3 to display the processed image. The image processing includes at least one of the linear transformation, the translation, the color conversion, and the luminance conversion.

The values of the augmentation parameters may be determined in advance or may be set by a user. Further, image processing to be executed may be determined in advance by selection from the linear transformation processing, the translation processing, the color conversion processing, and the luminance conversion processing, or may be set by the user. In a scene where the image recognition is actually performed, some parts of the image processing might be unnecessary. For example, in a case where the image recognition is performed by using an image captured at a place where brightness is always constant, the luminance conversion processing is unnecessary. As described above, since unnecessary processing is not executed in the environment where the image recognition is actually performed, over learning of the machine learning model can be reduced.

When causing the display device 3 to display the processed image, the display controller 25 outputs a display completion signal to the imaging controller 26. Note that the display completion signal includes a correct answer label assigned to the displayed image.

Note that the display controller 25 may execute a plurality of types of image processing on one image. In addition, the display controller 25 may execute one type of image processing on one image more than once while changing the parameter value. For example, in the case of the rotation processing, a plurality of rotation angles is acquired. The display controller 25 may sequentially display a plurality of images obtained by rotation in accordance with the plurality of rotation angles.

The imaging controller 26 causes the imaging device 4 to capture an image displayed on the display device 3. When receiving the display completion signal from the display controller 25, the imaging controller 26 causes the imaging device 4 to capture the image. The imaging device 4 outputs the captured image to the output unit 27. Further, the imaging controller 26 outputs the correct answer label to the output unit 27.

The output unit 27 outputs the captured image obtained by the imaging device 4 as the training data. The output unit 27 stores the captured image received from the imaging device 4 as the training data in the training data storage unit 28. At this time, the output unit 27 assigns the correct answer label assigned in advance to the image to the captured image, and outputs the captured image with the assigned correct answer label as the training data. That is, the output unit 27 stores the captured image with the assigned correct answer label as the training data in the training data storage unit 28.

The training data storage unit 28 stores the training data output by the output unit 27. The training data is data in which the captured image and the correct answer label are associated with each other. The training data storage unit 28 stores a training data set to be used for training a machine learning model. In the first embodiment, although the control device 2 includes the training data storage unit 28, the present disclosure is not particularly limited thereto. An external computer connected to the control device 2 via a network may include the training data storage unit 28. In this case, the output unit 27 may transmit the training data to the external computer.

The training unit 29 trains the machine learning model using the training data stored in the training data storage unit 28. Machine learning such as deep learning using a multilayer neural network may be used in training for creating a machine learning model.

The training unit 29 executes the training processing using the captured image and the correct answer label acquired from the training data storage unit 28. For example, in a case where the machine learning model is constructed by a multilayer neural network, machine learning using deep learning is performed by using the captured image and the correct answer label as teacher data. The training unit 29 performs machine learning on the machine learning model using the captured image as an input value and the correct answer label as an output value. The training unit 29 stores the trained machine learning model in the model storage unit 30.

As the machine learning, for example, supervised learning is used. In the supervised learning, the machine learning model is trained in a relationship between the input and the output by using teacher data in which a label (output information) is assigned to input information. Note that, examples of the machine learning may include unsupervised learning, semi-supervised learning, and reinforcement learning. In the unsupervised learning, a data structure is constructed only from an unlabeled input. In the semi-supervised learning, both labeled and unlabeled inputs are used. In the reinforcement learning, behavior that maximizes a reward is trained by trial and error. Further, a specific method of the machine learning includes a neural network (including deep learning using a multilayer neural network), genetic programming, a decision tree, a Bayesian network, and a support vector machine (SVM). In the machine learning of the present disclosure, for example, a deep neural network (DNN) or a convolutional neural network (CNN) is used.

In the first embodiment, although the output unit 27 stores the captured image with the assigned correct answer label as the training data in the training data storage unit 28, the present disclosure is not particularly limited thereto. The output unit 27 may store only the captured image as the training data in the training data storage unit 28. In this case, the training unit 29 may assign the correct answer label to the read the training data when reading the training data from the training data storage unit 28 at the time of training.

In addition, when the training unit 29 performs the unsupervised learning, the correct answer label is unnecessary. Therefore, only the captured image is stored as the training data in the training data storage unit 28.

The model storage unit 30 stores the trained machine learning model. The machine learning model is also an image recognition model to be used for image recognition.

In the first embodiment, although the control device 2 has the training unit 29 and the model storage unit 30, the present disclosure is not particularly limited thereto. An external computer connected to the control device 2 via a network may include the training unit 29 and the model storage unit 30. In this case, the control device 2 may further include a communication unit that transmits the training data to the external computer. In addition, the external computer connected to the control device 2 via the network may include the model storage unit 30. In this case, the control device 2 may further include a communication unit that transmits the trained machine learning model to the external computer.

Subsequently, training data generation processing in the control device 2 according to the first embodiment of the present disclosure will be described.

Figure 5:
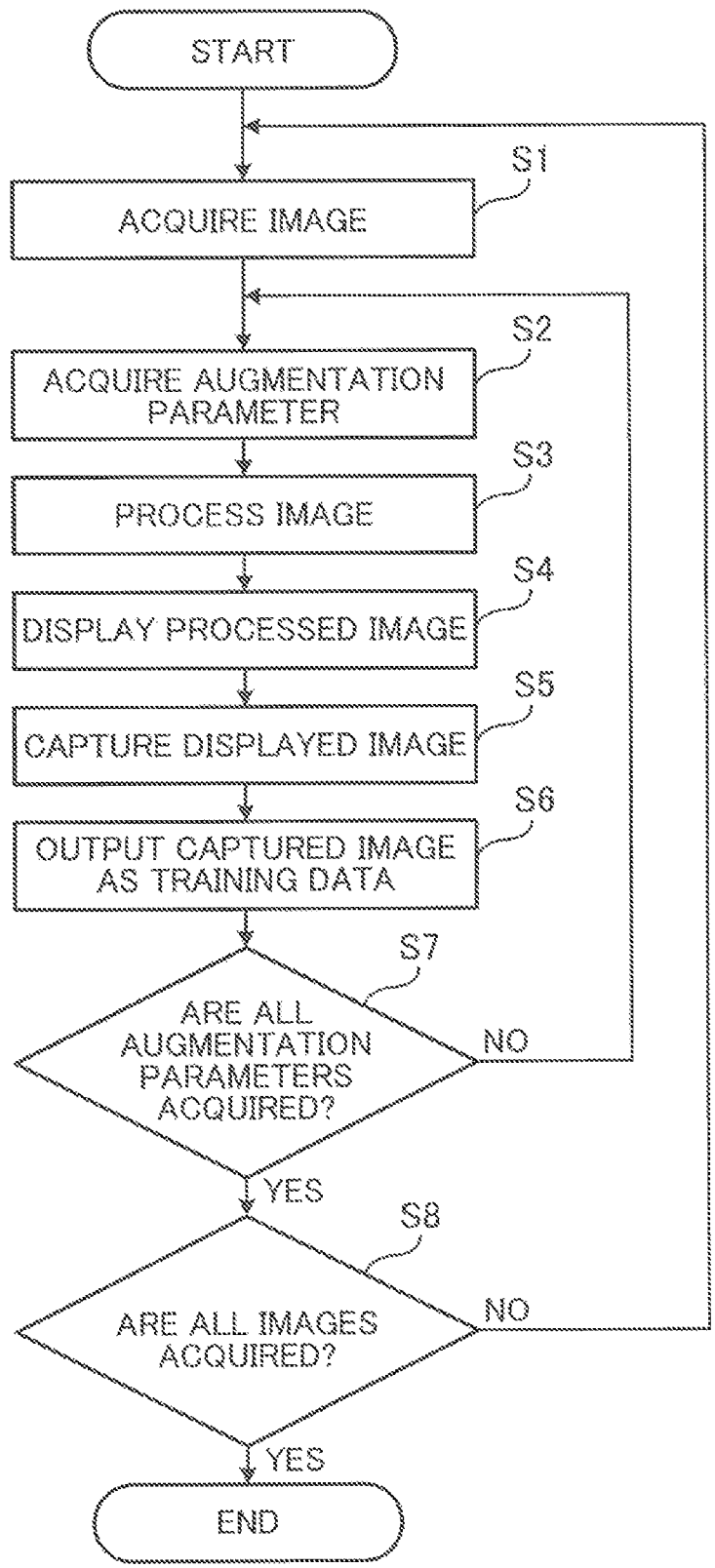
FIG. 5 is a flowchart for explaining training data generation processing in a control device according to the first embodiment of the present disclosure.

FIG. 5 is a flowchart for explaining the training data generation processing in the control device 2 according to the first embodiment of the present disclosure.

First, in step S1, the image acquisition unit 22 acquires an image from the image storage unit 21. Note that, in a case where the image storage unit 21 stores a plurality of images, the image acquisition unit 22 acquires one image among the plurality of images.

Next, in step S2, the parameter acquisition unit 24 acquires an augmentation parameter from the parameter storage unit 23. In a case where the parameter storage unit 23 stores a plurality of augmentation parameters, the parameter acquisition unit 24 acquires one augmentation parameter among the plurality of augmentation parameters.

In step S3, the display controller 25 processes the image acquired by the image acquisition unit 22 in accordance with the augmentation parameter acquired by the parameter acquisition unit 24.

For example, in a case where the image processing is the translation processing, the display controller 25 translates the image in accordance with a translation direction and a translation amount included in the augmentation parameter. Note that the augmentation parameter may include the translation direction and a range of translation amounts. In this case, the display controller 25 may randomly determine the translation amount from the range of the translation amounts included in the augmentation parameter, and translate the image in accordance with the determined translation amount.

In a case where the image processing is the rotation processing, the display controller 25 rotates the image in accordance with a rotation angle included in the augmentation parameter. The augmentation parameter may include a range of rotation angles. In this case, the display controller 25 may randomly determine the rotation angle from the range of rotation angles included in the augmentation parameter, and rotate the image in accordance with the determined rotation angle.

In a case where the image processing is the enlargement processing, the display controller 25 enlarges the image in accordance with a scale of enlargement included in the augmentation parameter. The augmentation parameter may include a range of scales of enlargement. In this case, the display controller 25 may randomly determine a scale of enlargement from the range of the scales of enlargement included in the augmentation parameter, and enlarge the image in according with the determined scale of enlargement.

In a case where the image processing is the reduction processing, the display controller 25 reduces an image in accordance with a scale of reduction included in the augmentation parameter. The augmentation parameter may include a range of scales of reduction. In this case, the display controller 25 may randomly determine a scale of reduction from the range of the scales of reduction included in the augmentation parameter, and reduce the image in accordance with the determined scale of reduction.

In a case where the image processing is the shear processing, the display controller 25 performs shear transformation on an image in accordance with an inclination angle included in the augmentation parameter. The augmentation parameter may include a range of inclination angles. In this case, the display controller 25 may randomly determine an inclination angle from the range of the inclination angles included in the augmentation parameter, and perform the shear transformation on the image in accordance with the determined inclination angle.

In a case where the image processing is the color conversion processing, the display controller 25 converts a color of an image in accordance with an RGB value included in the augmentation parameter. The augmentation parameter may include a range of RGB values. In this case, the display controller 25 may randomly determine an RGB value from the range of the RGB values included in the augmentation parameter, and convert the color of the image in accordance with the determined RGB value.

Further, in a case where the image processing is the luminance conversion processing, the display controller 25 converts luminance of an image in accordance with a luminance value included in the augmentation parameter. The augmentation parameter may include a range of luminance values. In this case, the display controller 25 may randomly determine a luminance value from the range of the luminance values included in the augmentation parameter, and convert the luminance of the image in accordance with the determined luminance value.

Note that the display controller 25 may combine a plurality of the image processing. For example, the display controller 25 may combine the translation processing and the rotation processing.

Next, in step S4, the display controller 25 causes the display device 3 to display the image processed in accordance with the augmentation parameter. The display device 3 displays the image processed by the display controller 25. At this time, the display controller 25 outputs a display completion signal including the correct answer label assigned to the original image to the imaging controller 26.

In step S5, the imaging controller 26 causes the imaging device 4 to capture the image displayed on the display device 3. The imaging device 4 captures the image displayed on the display device 3 and outputs the captured image to the output unit 27. At this time, the imaging controller 26 outputs the correct answer label assigned to the original image to the output unit 27.

In step S6, the output unit 27 outputs the captured image obtained by the imaging device 4 to the training data storage unit 28 as the training data. At this time, the output unit 27 assigns the correct answer label, which has been assigned in advance to the original image, to the captured image, and outputs the captured image with the assigned correct answer label to the training data storage unit 28 as the training data. As a result, the training data is stored in the training data storage unit 28.

In step S7, the parameter acquisition unit 24 determines whether all the augmentation parameters stored in the parameter storage unit 23 have been acquired. Here, when the determination is made that not all the augmentation parameters have been acquired (NO in step S7), the processing returns to step S2. The parameter acquisition unit 24 then acquires another augmentation parameter stored in the parameter storage unit 23.

On the other hand, when the determination is made that all the augmentation parameters have been acquired (YES in step S7), the image acquisition unit 22 determines in step S8 whether all the images have been acquired from the image storage unit 21. Here, when the determination is made that not all the images have been acquired (NO in step S8), the processing returns to step S1. The image acquisition unit 22 then acquires another image stored in the image storage unit 21.

On the other hand, when the determination is made that all the images have been acquired (YES in step S8), the training data generation processing ends. When the determination is made that all the images have been acquired, the training unit 29 may train the machine learning model using the training data stored in the training data storage unit 28. Then, the training unit 29 may store the trained machine learning model in the model storage unit 30.

In this manner, the image is displayed on the display device 3 based on the parameter regarding geometric augmentation or optical augmentation of the training data, the displayed image is captured by the imaging device 4, and the captured image obtained by the imaging device 4 is output as the training data. This makes it possible to increase image variations that have come under the same influence of the optical system of the imaging device 4 as the training data. It is possible to generate the training data matching the characteristic of the optical system of the imaging device 4 at the time of image recognition without using, for training, the captured image that does not reflect the characteristic of the optical system of the imaging device 4. Since the same characteristic of the optical system of the imaging device 4 are reflected in the image to be used for training and the image to be used for recognition, erroneous recognition can be reduced. Further, since the training data set suitable for image recognition is constructed, the amount of the training data can be reduced, and thus over-learning can be avoided.

Figure 6:
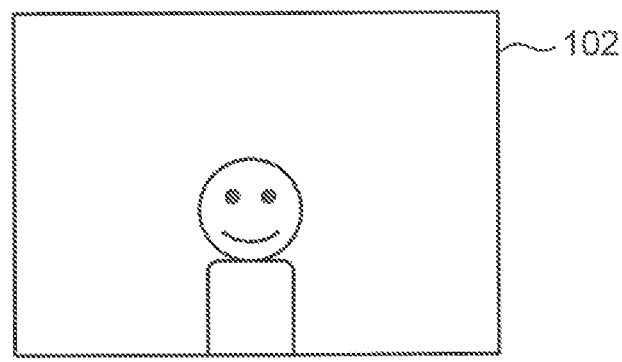
FIG. 6 is a schematic diagram for explaining the training data generation processing according to the first embodiment.
Figure 6:
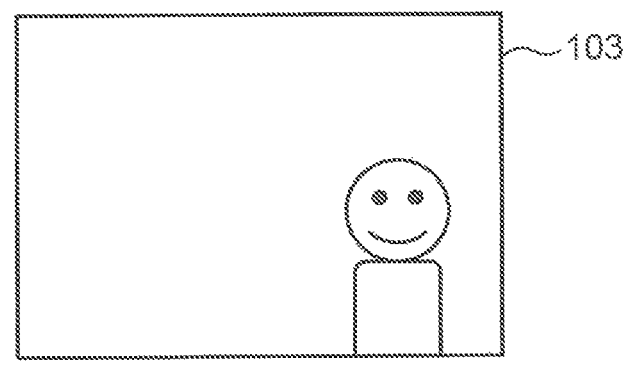
Figure 6:
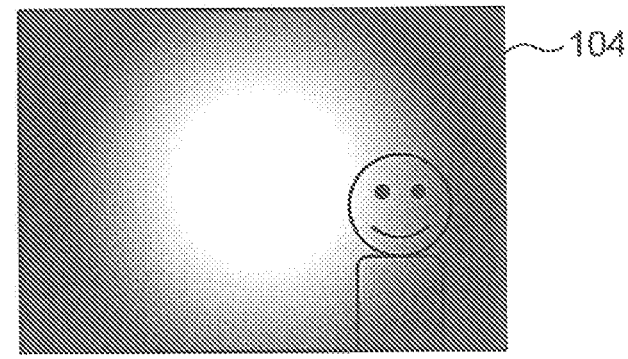

FIG. 6 is a schematic diagram for explaining the training data generation processing according to the first embodiment.

The display controller 25 executes the image processing on an original image 102 acquired by the image acquisition unit 22. In FIG. 6, the processing for translating the original image 102 rightward is executed. The display controller 25 then causes the display device 3 to display the processed image. As a result, the display device 3 displays a displayed image 103. Then, the imaging controller 26 captures the displayed image 103 displayed on the display device 3. Thus, the imaging device 4 obtains a captured image 104. The captured image 104 reflects the characteristic obtained by the optical system of the imaging device 4, that is, a pattern of limb darkening caused by the imaging device 4. Therefore, data augmentation can be performed in consideration of the influence of the optical system of the imaging device 4. Further, when the machine learning model is trained by using the captured image 104 reflecting the characteristic obtained by the optical system of the imaging device 4 as the training data, the image recognition accuracy of the machine learning model can be improved.

Figure 7:
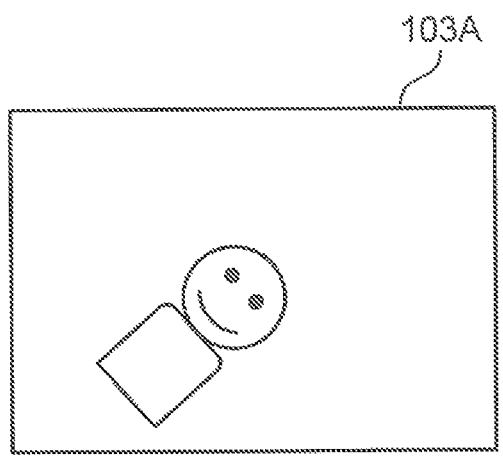
FIG. 7 is a diagram illustrating an example of a displayed image on which rotation processing has been executed.

FIG. 7 is a diagram illustrating an example of a displayed image on which the rotation processing has been executed. A displayed image 103A illustrated in FIG. 7 is generated by rotating the original image 102 illustrated in FIG. 6 by 45 degrees. The imaging controller 26 causes the imaging device 4 to capture the displayed image 103A on which the rotation processing has been executed. This makes it possible to increase image variations that have come under the same influence of the optical system of the imaging device 4 as the training data.

Figure 8:
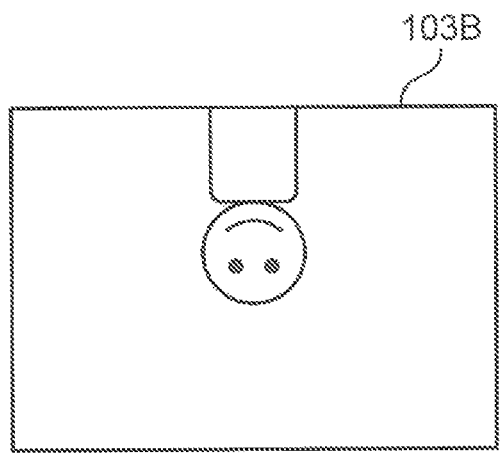
FIG. 8 is a diagram illustrating an example of a displayed image on which flip processing has been executed.

FIG. 8 is a diagram illustrating an example of the displayed image on which flip processing has been executed. A displayed image 103B illustrated in FIG. 8 is generated by vertically flipping the original image 102 illustrated in FIG. 6. The imaging controller 26 causes the imaging device 4 to capture the displayed image 103B on which the flip processing has been executed. This makes it possible to increase image variations that have come under the same influence of the optical system of the imaging device 4 as the training data.

Figure 9:
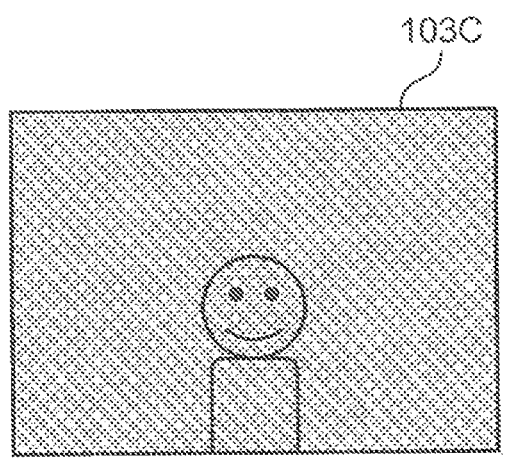
FIG. 9 is a diagram illustrating an example of a displayed image on which color conversion processing has been executed.

FIG. 9 is a diagram illustrating an example of a displayed image on which the color conversion processing has been executed. A displayed image 103C illustrated in FIG. 9 is generated by converting the RGB value of the original image 102 illustrated in FIG. 6 into a predetermined RGB value. The imaging controller 26 causes the imaging device 4 to capture the displayed image 103C on which the color conversion processing has been executed. This makes it possible to increase image variations that have come under the same influence of the optical system of the imaging device 4 as the training data.

Figure 10:
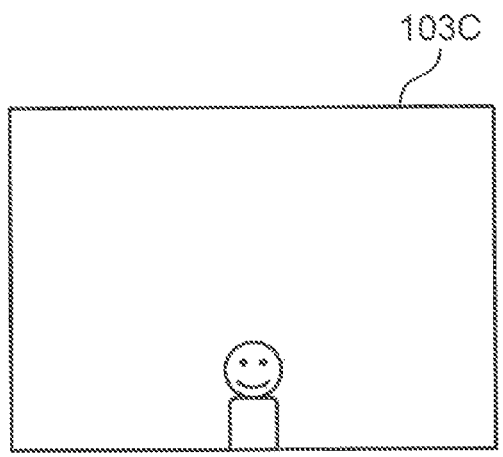
FIG. 10 is a diagram illustrating an example of a displayed image on which reduction processing has been executed.

FIG. 10 is a diagram illustrating an example of a displayed image on which the reduction processing has been executed. A displayed image 103D illustrated in FIG. 10 is generated by reducing the original image 102 illustrated in FIG. 6. The imaging controller 26 causes the imaging device 4 to capture the displayed image 103D on which the reduction processing has been executed. This makes it possible to increase image variations that have come under the same influence of the optical system of the imaging device 4 as the training data.

Second Embodiment

The display controller 25 according to the first embodiment causes the display device 3 to display an image based on the augmentation parameter. On the other hand, a display controller according to a second embodiment causes a display device 3 to display an image based on an augmentation parameter and luminance characteristic information indicating a luminance characteristic obtained by an optical system of an imaging device 4.

Figure 11:
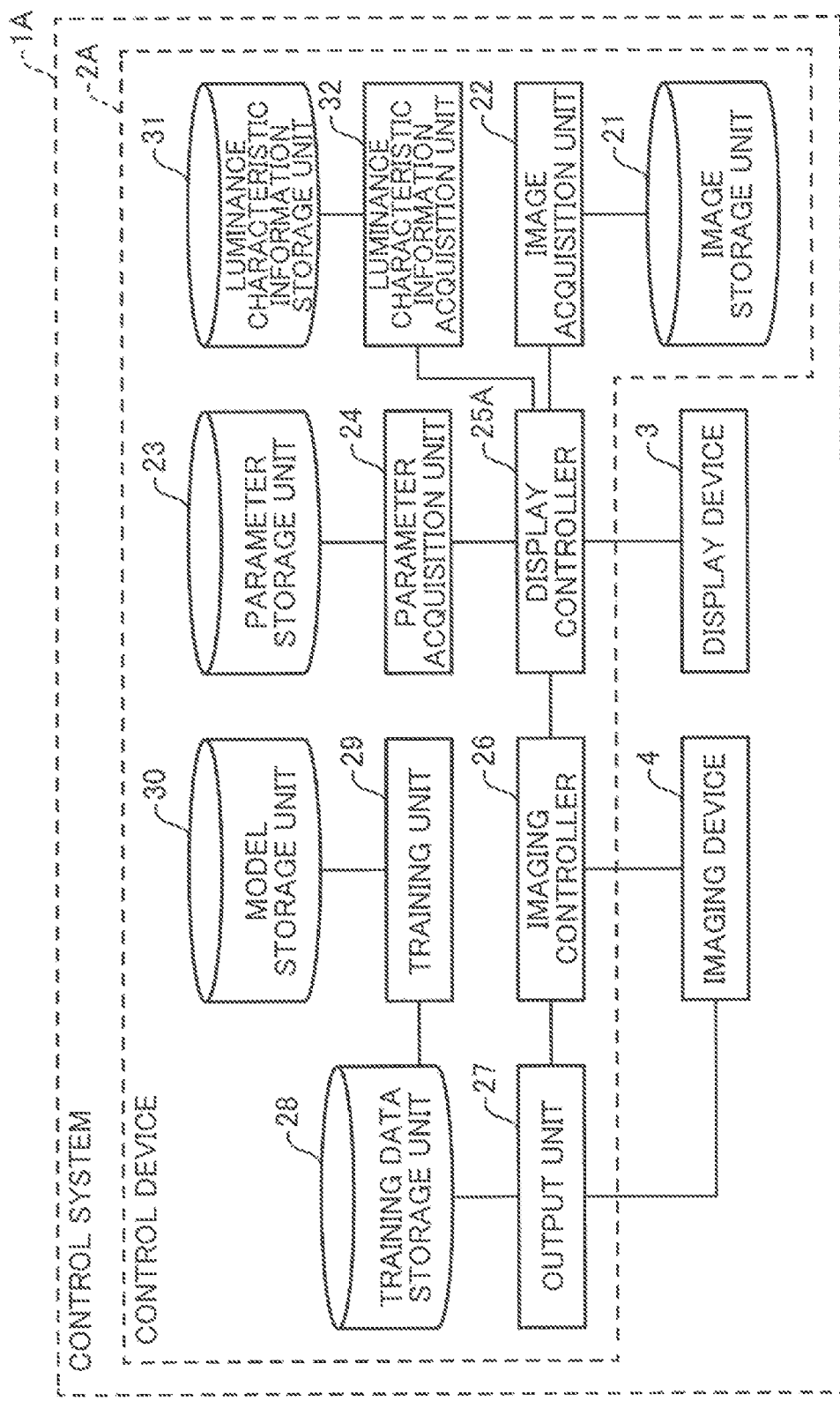
FIG. 11 is a block diagram illustrating an example of an overall configuration of a control system according to a second embodiment of the present disclosure.

FIG. 11 is a block diagram illustrating an example of an overall configuration of a control system 1A according to the second embodiment of the present disclosure. The components identical to those of the first and second embodiments are denoted by the identical reference numerals, and the description thereof will be omitted.

The control system 1A includes a control device 2A, the display device 3, and the imaging device 4. The control device 2A includes an image storage unit 21, an image acquisition unit 22, a parameter storage unit 23, a parameter acquisition unit 24, a display controller 25A, an imaging controller 26, an output unit 27, a training data storage unit 28, a training unit 29, a model storage unit 30, a luminance characteristic information storage unit 31, and a luminance characteristic information acquisition unit 32.

The luminance characteristic information storage unit 31 stores in advance luminance characteristic information indicating a luminance characteristic obtained by the optical system of the imaging device 4. The luminance characteristic information represents a pattern of limb darkening of the imaging device 4, and represents a luminance value of each pixel of the captured image. For example, the luminance characteristic information is information for specifying a position of a luminance attenuation region where luminance is gradually attenuated in a captured image obtained by the imaging device 4.

The luminance characteristic information acquisition unit 32 acquires luminance characteristic information indicating the luminance characteristic obtained by the optical system of the imaging device 4. In a case where the image processing indicated by an augmentation parameter is translation processing, the luminance characteristic information acquisition unit 32 reads the luminance characteristic information from the luminance characteristic information storage unit 31.

The display controller 25A causes the display device 3 to display an image based on the augmentation parameter and the luminance characteristic information. The display controller 25A processes a region on the image, the region having a specific luminance characteristic, in accordance with the augmentation parameter, and causes the display device 3 to display the processed image.

Specifically, when the image processing indicated by the augmentation parameter is the translation processing, the display controller 25A specifies a luminance attenuation region on the image based on the luminance characteristic information. The shape of the luminance attenuation region may be set in advance. For example, the display controller 25A may specify, as the luminance attenuation region, a region where average luminance is less than or equal to a threshold on an image obtained by imaging a single color plane in advance. Alternatively, the display controller 25A may specify, as the luminance attenuation region, a region where an average value of the ratio in which a maximum luminance value is used as a denominator and a value of each pixel is used as a numerator is less than or equal to a threshold on the image obtained by imaging the single color plane in advance.

Then, the display controller 25A determines a translation direction and a translation amount so that a display object on the image is moved to the specified luminance attenuation region. Note that the position of the display object is assigned to the image in advance as annotation information together with the correct answer label. The display controller 25A moves the image in accordance with the determined translation direction and translation amount.

Subsequently, training data generation processing in the control device 2A according to the second embodiment of the present disclosure will be described.

Figure 12:
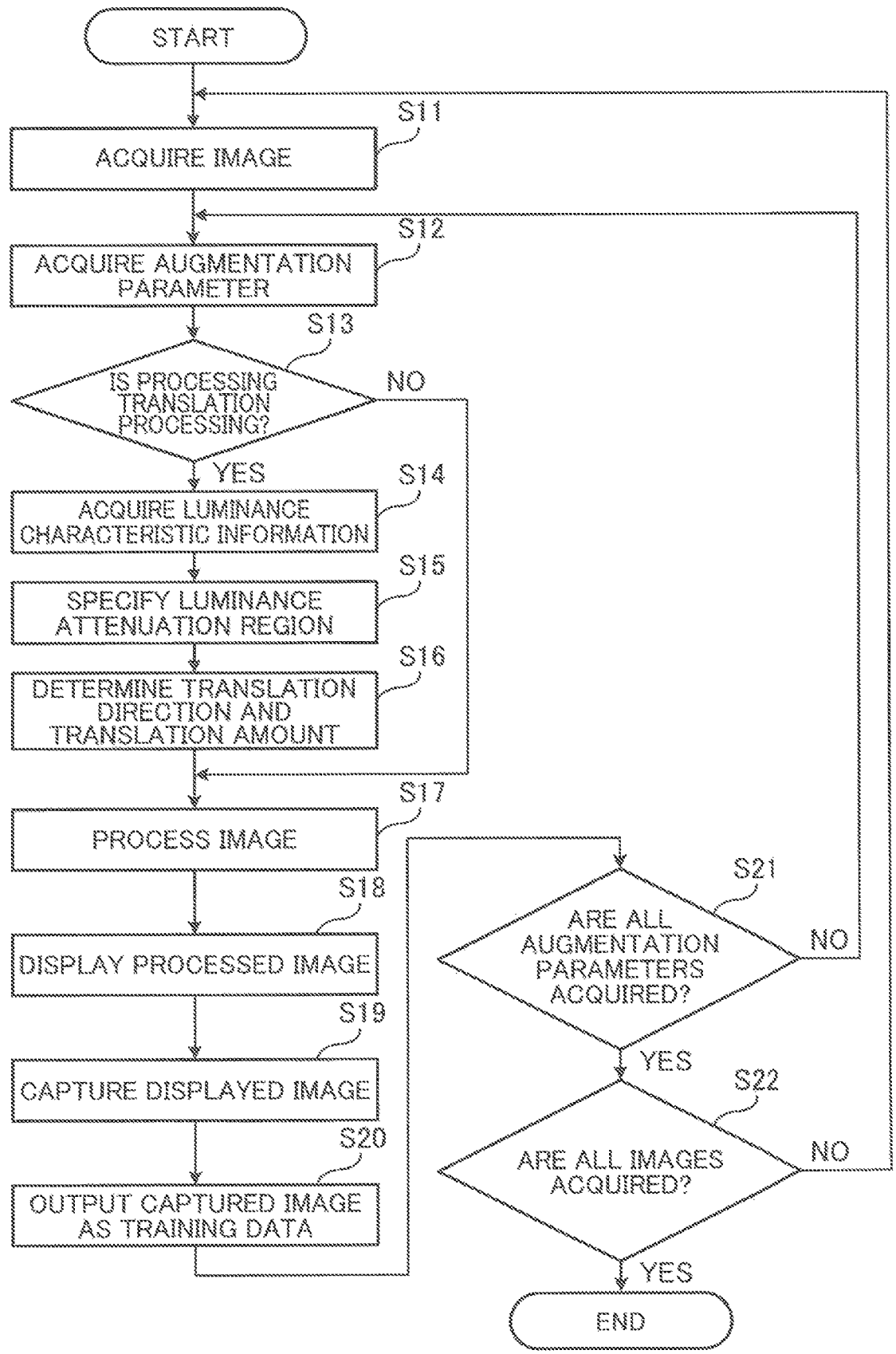
FIG. 12 is a flowchart for explaining training data generation processing in a control device according to the second embodiment of the present disclosure.

FIG. 12 is a flowchart for explaining the training data generation processing in the control device 2A according to the second embodiment of the present disclosure.

Since the processing in steps S11 and S12 is identical to the processing in steps S1 and S2 illustrated in FIG. 5, the description thereof will be omitted.

In step S13, the parameter acquisition unit 24 determines whether the image processing indicated by the acquired augmentation parameter is the translation processing. Here, when the determination is made that the image processing is not the translation processing (NO in step S13), the processing proceeds to step S17.

On the other hand, when the determination is made that the image processing is the translation processing (YES in step S13), in step S14, the luminance characteristic information acquisition unit 32 acquires the luminance characteristic information from the luminance characteristic information storage unit 31.

Figure 13:
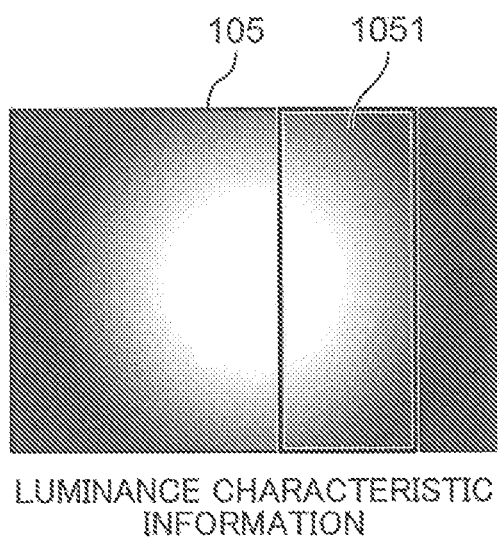
FIG. 13 is a diagram for explaining luminance characteristic information acquired by a luminance characteristic information acquisition unit.

FIG. 13 is a diagram for describing luminance characteristic information 105 acquired by luminance characteristic information acquisition unit 32. As illustrated in FIG. 13, the luminance characteristic information 105 represents a pattern of limb darkening caused by the optical system of imaging device 4, and represents a luminance value of each pixel of the captured image. The luminance characteristic information 105 is information for specifying the position of a luminance attenuation region 1051 where the luminance is gradually attenuated. The luminance attenuation region 1051 has, for example, a rectangular shape. Note that the shape of the luminance attenuation region 1051 is not limited to the rectangular shape. In addition, the luminance attenuation region 1051 may be a region including a boundary portion between a region where the luminance value is smaller than or equal to a threshold and a region where the luminance value is larger than the threshold.

Returning to FIG. 12, in step S15, the display controller 25A specifies a luminance attenuation region on the image acquired by the image acquisition unit 22 based on the luminance characteristic information acquired by the luminance characteristic information acquisition unit 32. The display controller 25A may specify, as the luminance attenuation region, a region where the average luminance is less than or equal to a threshold on an image obtained by imaging a single color plane in advance. Further, the display controller 25A may specify a region having a specific luminance distribution (pattern of limb darkening) on the image as the luminance attenuation region. Alternatively, the display controller 25A may specify, as the luminance attenuation region, a region where an average value of the ratio in which a maximum luminance value is used as a denominator and a value of each pixel is used as a numerator is less than or equal to a threshold on the image obtained by imaging the single color plane in advance.

In step S16, the display controller 25A determines a translation direction and a translation amount so that the display object on the image moves to the specified luminance attenuation region. The display controller 25A determines the translation direction and the translation amount so that the display object is included in the specified luminance attenuation region on the image. Note that the display controller 25A may determine the translation direction and the translation amount of the image so that the center (center of gravity) of the display object is located on a perpendicular bisector of the luminance attenuation region.

In a case where a plurality of display objects is included in the image, the display controller 25A may determine a display object to be randomly translated among the plurality of display objects. Further, the display controller 25A may execute the translation processing for translating each of the plurality of display objects into the luminance attenuation region more than once, and cause the display device 3 to display the plurality of processed images.

In step S17, the display controller 25A processes the image acquired by the image acquisition unit 22 in accordance with the augmentation parameter acquired by the parameter acquisition unit 24 or the determined translation direction and translation amount. In the case where the image processing indicated by the augmentation parameter is the translation processing, the display controller 25A translates the image in accordance with the determined translation direction and translation amount. On the other hand, in a case where the image processing indicated by the augmentation parameter is image processing other than the translation processing, the display controller 25A processes the image in accordance with the augmentation parameter. Note that the image processing is identical to the image processing in the first embodiment.

Since the processing in steps S18 to S22 is identical to the processing in steps S4 to S8 illustrated in FIG. 5, the description thereof will be omitted.

Figure 14:
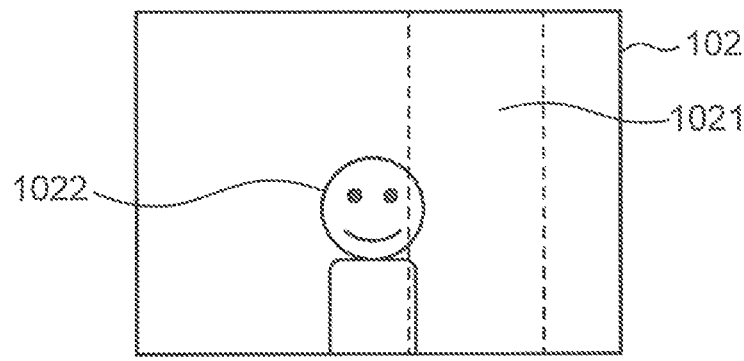
FIG. 14 is a schematic diagram for explaining training data generation processing according to the second embodiment.
Figure 14:
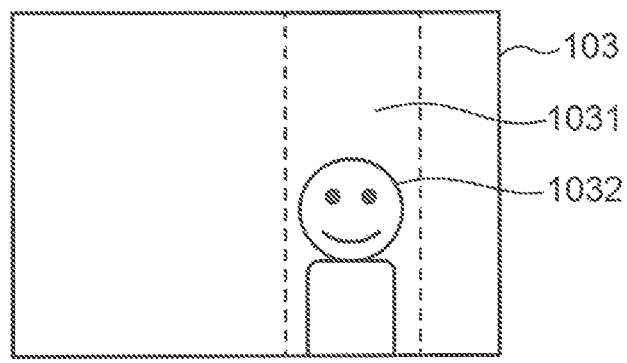
Figure 14:
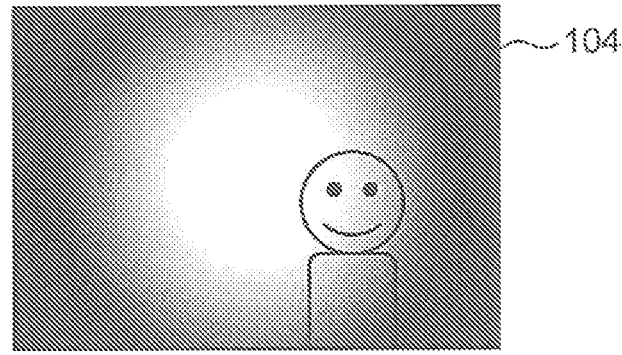

FIG. 14 is a schematic diagram for explaining the training data generation processing in the second embodiment.

The display controller 25A executes the image processing on the original image 102 acquired by the image acquisition unit 22. In a case where the image processing indicated by the augmentation parameter is the translation processing, the display controller 25A specifies a luminance attenuation region 1021 on the original image 102 based on the luminance characteristic information. The display controller 25A then determines a translation direction and a translation amount of the original image 102 so that a display object 1022 on the original image 102 moves to the specified luminance attenuation region 1021. The display controller 25A then translates the original image 102 in accordance with the determined translation direction and translation amount.

Then, the display controller 25A causes the display device 3 to display the translated image. As a result, the display device 3 displays a displayed image 103. At this time, a display object 1032 of the displayed image 103 is displayed within a luminance attenuation region 1031. Then, the imaging controller 26 captures the displayed image 103 displayed on the display device 3. Thus, the imaging device 4 obtains a captured image 104. The captured image 104 reflects the luminance characteristic produced by the optical system of imaging device 4. A display object 1042 is present in a position where the luminance of the captured image 104 is attenuated. Therefore, it is possible to extend the training data reflecting the luminance characteristic produced by the optical system of the imaging device 4.

Note that, in the second embodiment, the display controller 25A may cause the display device 3 to display an image based on the augmentation parameter and point spread function (PSF) information. The PSF information is information indicating a PSF in each of a plurality of regions obtained by dividing the captured image obtained by the imaging device 4. For example, the captured image is divided into a plurality of rectangular regions of 3×5 in height×width. The control device 2 may further include a PSF information storage unit that stores the PSF information in advance, and a PSF information acquisition unit that acquires the PSF information from the PSF information storage unit. The display controller 25A may process a region on the image, the region having a specific PSF, in accordance with the augmentation parameter, and cause the display device 3 to display the processed image.

The technique of the present disclosure is useful for a technique for generating the training data to be used for training a machine learning model because image variations that have come under the same influence of the optical system of the imaging device can be increased as the training data.

This application is based on Japanese Patent application No. 2020-215791 filed in Japan Patent Office on Dec. 24, 2021, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A control system, comprising:
a processor; and
a memory including a program that, when executed by the processor, causes the processor to perform operations, the operations including:
acquiring (i) a parameter regarding geometric augmentation or optical augmentation of training data to be used for training a machine learning model and (ii) luminance characteristic information indicating a luminance characteristic obtained by an optical system of an imaging device;
executing image processing on a region of an image in accordance with the parameter, the region having the luminance characteristic indicated by the luminance characteristic information;
causing a display device to display the processed image;
causing the imaging device to capture the displayed image; and
outputting the captured image obtained by the imaging device as the training data.

2. The control system according to claim 1, wherein the image processing includes at least one of linear transformation, translation, color conversion, and luminance conversion.

3. The control system according to claim 1,
wherein the imaging device includes a multi-pinhole camera in which a mask having a mask pattern with a plurality of pinholes is disposed to cover a light receiving surface of an imaging element.

4. The control system according to claim 1, wherein the operations further include:
training the machine learning model using the training data.

5. The control system according to claim 1, wherein
the image to be displayed on the display device is provided with a correct answer label to be used for training in advance, and
the processor assigns the correct answer label assigned in advance to the image to the captured image, and outputs the captured image with the correct answer label as the training data.

6. A control method performed by a computer, the control method comprising:
acquiring (i) a parameter regarding geometric augmentation or optical augmentation of training data to be used for training a machine learning model and (ii) luminance characteristic information indicating a luminance characteristic obtained by an optical system of an imaging device;
executing image processing on a region of an image in accordance with the parameter, the region having the luminance characteristic indicated by the luminance characteristic information;
causing a display device to display the processed image;
causing the imaging device to capture the displayed image; and
outputting the captured image obtained by the imaging device as the training data.

* * * * *